(12) United States Patent
Joshi et al.

(10) Patent No.: US 11,416,115 B2
(45) Date of Patent: Aug. 16, 2022

(54) SEARCH AND LOCATE EVENT ON CALENDAR WITH TIMELINE

(71) Applicant: Microsoft Technology Licensing, LLC, Redmond, WA (US)

(72) Inventors: Neel Joshi, Bellevue, WA (US); Jeannine Boone, Seattle, WA (US); Joan Li, Seattle, WA (US); Montine Rummel, Kirkland, WA (US); Johanna Hawkins, Redmond, WA (US); Mark Healy, Sammamish, WA (US); Christine Ergonis, Redmond, WA (US); Tor-Helge Persett, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 609 days.

(21) Appl. No.: 14/519,035

(22) Filed: Oct. 20, 2014

(65) Prior Publication Data
US 2015/0370904 A1     Dec. 24, 2015

Related U.S. Application Data

(60) Provisional application No. 62/015,350, filed on Jun. 20, 2014.

(51) Int. Cl.
*G06F 16/00*       (2019.01)
*G06F 3/0482*      (2013.01)
(Continued)

(52) U.S. Cl.
CPC .......... *G06F 3/0482* (2013.01); *G06F 3/0485* (2013.01); *G06F 3/0486* (2013.01);
(Continued)

(58) Field of Classification Search
CPC .. G06F 3/0482; G06F 16/9535; G06F 16/903; G06F 3/04847; G06Q 10/109; H04L 51/08
See application file for complete search history.

(56) References Cited

U.S. PATENT DOCUMENTS

| | | |
|---|---|---|
| 5,649,182 A | 7/1997 | Reitz |
| 5,745,110 A | 4/1998 | Ertemalp |

(Continued)

FOREIGN PATENT DOCUMENTS

| | | |
|---|---|---|
| CN | 1786852 A | 6/2006 |
| CN | 1868202 A | 11/2006 |
| CN | 101501713 A | 8/2009 |

OTHER PUBLICATIONS

Thayer, et al., "I Love You, Let's Share Calendars: Calendar Sharing as Relationship Work", In Proceedings of the ACM conference on Computer Supported Cooperative Work, Feb. 11, 2012, pp. 749-758.

(Continued)

*Primary Examiner* — Hung Q Pham
(74) *Attorney, Agent, or Firm* — NovoTechIP International PLLC (57) ABSTRACT

Searching and locating an event on a calendar with a timeline is provided. An application such as a calendar application detects a search on the calendar or the timeline. One or more events are located on the calendar or on the timeline that match a search term of the search. The search term on the one or more events is highlighted. The one or more events with the search term that is highlighted are displayed on the calendar or the timeline.

15 Claims, 7 Drawing Sheets

(51) Int. Cl.

| | | |
|---|---|---|
| G06F 3/04842 | (2022.01) | |
| G06F 3/0485 | (2022.01) | |
| H04L 67/02 | (2022.01) | |
| G06F 16/903 | (2019.01) | |
| G06F 16/9535 | (2019.01) | |
| G06Q 10/10 | (2012.01) | |
| G06F 3/04847 | (2022.01) | |
| G06F 3/0486 | (2013.01) | |
| G06F 3/04855 | (2022.01) | |
| G06F 3/04883 | (2022.01) | |
| H04L 12/18 | (2006.01) | |
| H04L 51/08 | (2022.01) | |

(52) U.S. Cl.
CPC ...... *G06F 3/04842* (2013.01); *G06F 3/04847* (2013.01); *G06F 3/04855* (2013.01); *G06F 3/04883* (2013.01); *G06F 16/903* (2019.01); *G06F 16/9535* (2019.01); *G06Q 10/109* (2013.01); *G06Q 10/1093* (2013.01); *H04L 12/1813* (2013.01); *H04L 51/08* (2013.01); *H04L 67/02* (2013.01)

(56) References Cited

U.S. PATENT DOCUMENTS

| | | | |
|---|---|---|---|
| 5,898,431 | A | 4/1999 | Webster et al. |
| 6,016,478 | A | 1/2000 | Zhang et al. |
| 6,360,217 | B1 | 3/2002 | Gopal et al. |
| 6,369,840 | B1 | 4/2002 | Barnett et al. |
| 6,603,489 | B1 | 8/2003 | Edlund et al. |
| 6,678,698 | B2 | 1/2004 | Fredell et al. |
| 7,149,810 | B1 | 12/2006 | Miller et al. |
| 7,263,667 | B1 | 8/2007 | Hoellerer et al. |
| 7,349,920 | B1 | 3/2008 | Feinberg et al. |
| 7,502,798 | B2 | 3/2009 | Trowbridge et al. |
| 7,673,248 | B2 | 3/2010 | Narayanaswami |
| 7,721,210 | B2 | 5/2010 | Mansikkaniemi et al. |
| 7,870,194 | B2 | 1/2011 | Michel et al. |
| 7,921,026 | B2 | 4/2011 | O'Cull et al. |
| 7,933,955 | B2 | 4/2011 | Khalatian |
| 7,970,751 | B2 * | 6/2011 | McBride Fesq ....... G06Q 10/10 707/706 |
| 8,005,906 | B2 | 8/2011 | Hayashi et al. |
| 8,122,362 | B2 | 2/2012 | Brush et al. |
| 8,359,538 | B2 | 1/2013 | Jyrinki |
| 8,407,075 | B2 | 3/2013 | Lance et al. |
| 8,423,088 | B2 | 4/2013 | Ickman et al. |
| 8,510,677 | B2 | 8/2013 | van Os |
| 8,537,983 | B1 | 9/2013 | Haggerty et al. |
| 8,577,959 | B2 | 11/2013 | Pandey et al. |
| 8,712,820 | B2 | 4/2014 | Gingras et al. |
| 8,745,141 | B2 | 6/2014 | Rosenberg et al. |
| 8,793,611 | B2 | 7/2014 | Van Os |
| 9,292,521 | B1 | 3/2016 | Goo et al. |
| 9,489,111 | B2 | 11/2016 | van Os |
| 9,746,997 | B2 | 8/2017 | Joshi et al. |
| 2002/0186252 | A1 | 12/2002 | Himmel et al. |
| 2002/0196280 | A1 | 12/2002 | Bassett et al. |
| 2003/0225732 | A1 | 12/2003 | Chan et al. |
| 2004/0109137 | A1 | 6/2004 | Bubie et al. |
| 2004/0181425 | A1 | 9/2004 | Schwerin-Wenzel et al. |
| 2004/0268270 | A1 | 12/2004 | Hill et al. |
| 2005/0105374 | A1 | 5/2005 | Finke-Anlauff et al. |
| 2005/0108253 | A1 | 5/2005 | Metsatahti et al. |
| 2005/0182709 | A1 | 8/2005 | Belcsak et al. |
| 2005/0204309 | A1 | 9/2005 | Szeto |
| 2005/0222971 | A1 | 10/2005 | Cary |
| 2005/0262450 | A1 | 11/2005 | Sauermann |
| 2005/0267975 | A1 | 12/2005 | Qureshi et al. |
| 2006/0020889 | A1 | 1/2006 | Coppinger et al. |
| 2006/0028917 | A1 | 2/2006 | Wigginton |
| 2006/0069604 | A1 | 3/2006 | Leukart et al. |
| 2006/0200372 | A1 | 9/2006 | O'Cull et al. |
| 2006/0236269 | A1 | 10/2006 | Borna |
| 2006/0265263 | A1 | 11/2006 | Burns |
| 2006/0279628 | A1 | 12/2006 | Fleming |
| 2007/0027938 | A1 | 2/2007 | Clarke |
| 2007/0038494 | A1 | 2/2007 | Kreitzberg et al. |
| 2007/0168892 | A1 | 7/2007 | Brush et al. |
| 2007/0182763 | A1 | 8/2007 | Venolia |
| 2007/0209019 | A1 | 9/2007 | Kaval et al. |
| 2007/0283247 | A1 | 12/2007 | Brenneman et al. |
| 2008/0016155 | A1 | 1/2008 | Khalatian |
| 2008/0016451 | A1 | 1/2008 | Funabashi et al. |
| 2008/0034047 | A1 | 2/2008 | Rosenberg et al. |
| 2008/0082578 | A1 * | 4/2008 | Hogue ............... G06F 3/04845 |
| 2008/0082925 | A1 * | 4/2008 | Brush ................ G06Q 10/1093 715/744 |
| 2008/0109718 | A1 | 5/2008 | Narayanaswami |
| 2008/0134017 | A1 | 6/2008 | Inoguchi et al. |
| 2008/0134041 | A1 | 6/2008 | Zinn |
| 2008/0141145 | A1 | 6/2008 | Klausmeier |
| 2008/0168050 | A1 | 7/2008 | Reyes et al. |
| 2008/0195452 | A1 | 8/2008 | Ponce de Leon |
| 2008/0195455 | A1 | 8/2008 | May et al. |
| 2008/0235072 | A1 | 9/2008 | Gupta et al. |
| 2008/0294663 | A1 * | 11/2008 | Heinley ............... G06F 3/0481 |
| 2008/0294994 | A1 | 11/2008 | Kruger et al. |
| 2008/0307323 | A1 | 12/2008 | Coffman et al. |
| 2009/0049123 | A1 | 2/2009 | Dargahi et al. |
| 2009/0063947 | A1 | 3/2009 | Anderson |
| 2009/0100347 | A1 | 4/2009 | Schemers et al. |
| 2009/0138307 | A1 | 5/2009 | Belcsak et al. |
| 2009/0157513 | A1 | 6/2009 | Bonev et al. |
| 2009/0193353 | A1 | 7/2009 | Sharp et al. |
| 2009/0196123 | A1 | 8/2009 | Gautam |
| 2009/0240611 | A1 | 9/2009 | Augustine et al. |
| 2009/0241048 | A1 | 9/2009 | Augustine et al. |
| 2009/0254825 | A1 * | 10/2009 | Sichart ................ G06Q 10/109 715/716 |
| 2009/0281859 | A1 | 11/2009 | Isaacson |
| 2009/0292690 | A1 | 11/2009 | Culbert |
| 2010/0102982 | A1 | 4/2010 | Hoveida |
| 2010/0159967 | A1 | 6/2010 | Pounds et al. |
| 2010/0223089 | A1 | 9/2010 | Godfrey et al. |
| 2010/0262926 | A1 | 10/2010 | Gupta et al. |
| 2010/0275148 | A1 | 10/2010 | Pan et al. |
| 2010/0313151 | A1 | 12/2010 | Wei et al. |
| 2010/0318398 | A1 | 12/2010 | Brun et al. |
| 2010/0332514 | A1 | 12/2010 | Steele et al. |
| 2011/0071878 | A1 | 3/2011 | Gingras et al. |
| 2011/0105095 | A1 | 5/2011 | Kedefors et al. |
| 2011/0126150 | A1 | 5/2011 | Haynes et al. |
| 2011/0167369 | A1 | 7/2011 | Van Os |
| 2011/0184943 | A1 | 7/2011 | Norton et al. |
| 2011/0202866 | A1 | 8/2011 | Huang et al. |
| 2011/0202879 | A1 | 8/2011 | Stovicek et al. |
| 2011/0212711 | A1 | 9/2011 | Scott |
| 2011/0239146 | A1 | 9/2011 | Dutta et al. |
| 2011/0252351 | A1 | 10/2011 | Sikora et al. |
| 2011/0283224 | A1 | 11/2011 | Ramsey et al. |
| 2011/0296312 | A1 | 12/2011 | Boyer et al. |
| 2012/0005261 | A1 | 1/2012 | Pandey et al. |
| 2012/0047421 | A1 | 2/2012 | Holman |
| 2012/0150784 | A1 | 6/2012 | Mital et al. |
| 2012/0215578 | A1 | 8/2012 | Swierz et al. |
| 2012/0262472 | A1 | 10/2012 | Garr et al. |
| 2012/0331378 | A1 | 12/2012 | Baioura et al. |
| 2012/0331404 | A1 | 12/2012 | Buford et al. |
| 2013/0007648 | A1 | 1/2013 | Gamon et al. |
| 2013/0010575 | A1 | 1/2013 | He et al. |
| 2013/0018667 | A1 | 1/2013 | Nudd |
| 2013/0024206 | A1 | 1/2013 | Hughes et al. |
| 2013/0055106 | A1 | 2/2013 | Tarneberg et al. |
| 2013/0124990 | A1 | 5/2013 | Lettau |
| 2013/0151965 | A1 | 6/2013 | Demiris |
| 2013/0159198 | A1 | 6/2013 | Cartan et al. |
| 2013/0159875 | A1 | 6/2013 | Ahiakpor et al. |
| 2013/0227462 | A1 | 8/2013 | Hsu |
| 2013/0326401 | A1 * | 12/2013 | van Os ............... G06F 3/0483 715/802 |
| 2013/0335419 | A1 | 12/2013 | Bondesen et al. |

(56) References Cited

U.S. PATENT DOCUMENTS

| | | |
|---|---|---|
| 2014/0006938 A1 | 1/2014 | Black et al. |
| 2014/0012574 A1 | 1/2014 | Pasupalak et al. |
| 2014/0033025 A1 | 1/2014 | Mukherjee et al. |
| 2014/0082536 A1 | 3/2014 | Costa et al. |
| 2014/0101189 A1 | 4/2014 | Schenkel |
| 2014/0104158 A1 | 4/2014 | Abdukalykov et al. |
| 2014/0105492 A1 | 4/2014 | Das et al. |
| 2014/0108333 A1 | 4/2014 | Jain et al. |
| 2014/0129971 A1 | 5/2014 | King |
| 2014/0156597 A1 | 6/2014 | Hakami et al. |
| 2014/0157200 A1 | 6/2014 | Jeon |
| 2014/0181126 A1 | 6/2014 | Nadj et al. |
| 2014/0181928 A1 | 6/2014 | Bergman et al. |
| 2014/0281967 A1 | 9/2014 | Bodnick et al. |
| 2014/0304005 A1 | 10/2014 | Hughes et al. |
| 2014/0310045 A1 | 10/2014 | Meltzer et al. |
| 2014/0343990 A1 | 11/2014 | Photowat |
| 2014/0358613 A1 | 12/2014 | Libin |
| 2014/0365107 A1 | 12/2014 | Dutta et al. |
| 2014/0372898 A1* | 12/2014 | Ayres ............. G06Q 10/109 715/744 |
| 2015/0178260 A1 | 6/2015 | Brunson |
| 2015/0205491 A1 | 7/2015 | Taahloe |
| 2015/0234903 A1 | 8/2015 | Mukai et al. |
| 2015/0302531 A1 | 10/2015 | Thier et al. |
| 2015/0347980 A1 | 12/2015 | White et al. |
| 2015/0347983 A1 | 12/2015 | Jon et al. |
| 2015/0370421 A1 | 12/2015 | Joshi et al. |
| 2015/0370422 A1 | 12/2015 | Joshi et al. |
| 2015/0370440 A1 | 12/2015 | Joshi et al. |
| 2015/0370462 A1 | 12/2015 | Joshi et al. |
| 2015/0370463 A1 | 12/2015 | Joshi et al. |
| 2016/0034827 A1* | 2/2016 | Morris ............. G06F 3/04842 705/5 |
| 2018/0357305 A1 | 12/2018 | Kinast et al. |
| 2019/0294631 A1 | 9/2019 | Alcantara et al. |

OTHER PUBLICATIONS

Liu, et al., "A Temporal Reasoning based Social Calendar Framework", In International Journal of Multimedia and Ubiquitous Engineering, vol. 9, No. 5, Aug. 12, 2014, 8 pages.

Gkekas, et al., "A Smart Calendar Application for Mobile Environments", In Proceedings of the 3rd international conference on Mobile multimedia communications, Aug. 27, 2007, 5 pages.

"International Search Report & Written Opinion Received for PCT Application No. PCT/US2015/036564", dated Sep. 11, 2015, 10 Pages.

Byrne, et al., "Chapter 11. Searching Outlook Data", In Book: Programming Applications for Microsoft Office Outlook 2007, Feb. 28, 2007, 34 Pages.

"Full Calendar: Animate an event", Chammam, T., published on: Apr. 13, 2013, available at: http://stackoverflow.com/questions/15877417/full-calendar-animate-an-event.

"Welcome to dhtmixScheduler", published on Feb. 23, 2014, available at: http://web.archive.org/web/20140223134212/http://docs.dhtmlx.com/scheduler.

"Scheduler GUI", published on Feb. 25, 2014, available at: http://web.archive.org/web/20140225044235/http://docs.dhtmlx.com/scheduler/user interface.html.

"DHTMLX Scheduler .NET Documentation", published on May 9, 2014, available at: http://web.archive.org/web/20140509202129/http://scheduler-net.com/docs/.

"A Mashup using Google Calendar and Timeline", Retrieved from <<https://web.archive.org/web/20081231195709/http://campbell-lange.net/company/articles/googlemashup/>>, Retrieved Date: Dec. 31, 2008, 2 Pages.

"AEON Timeline", Retrieved from <<https://web.archive.org/web/20120610020235/http://www.scribblecode.com/release_support/AeonTimeline_UserManual.pdf>>, Retrieved Date: Jun. 10, 2012, 64 Pages.

"Calendar with Key Dates", Retrieved from<<https://web.archive.org/web/20120907090930/http://www.spreadsheetshoppe.com/calendar-key-dates—notes-at-bottom.html>>, Retrieved Date: Sep. 7, 2012, 3 Pages.

"Calendars", Retrieved from <<https://web.archive.org/web/20140720164737/https://asana.com/guide/learn/projects/calendar>>. Retrieved Date: Aug. 19, 2014, 2 Pages.

"Calie—Calendar for iPhone and iPad", Retrieved from <<https://web.archive.org/web/20141113023804/http://www.blackburninternet.com/calie/index.php>>. Retrieved Date: Aug. 19, 2014, 5 Pages.

"DHTMLX JavaPlanner", Retrieved from <<http://web.archive.org/web/20130221042642/http://javaplanner.com/features.htm>>. Retrieved Date: Feb. 21, 2013, 15 Pages.

"Events", Google Calendar API-Google Developers, Retrieved on: Aug. 12, 2014, 8 Pages.

"Exelon Enbeded DVR", Retrieved from <<https://web.archive.org/web/20140820115626/http://austinsecurity.ca/downloads/custfiles/embedded/Exelon/Exelon%20Search%20and%20Archive.pdf>>, Retrieved Date: Aug. 18, 2014, 8 Pages.

"How to Make a Timeline Online With Yahoo!", Retrieved from<<https://web.archive.org/web/20100803015018/http://www.ehow.com/how_6719273_make-timeline-online-yahoo_.html>>, Aug. 3, 2010, 3 Pages.

"Opera Dragonfly Documentation", Retrieved from<<https://web.archive.org/web/20130201233852/http://www.opera.com/dragonfly/documentation/profiler/>>, Feb. 1, 2013, 3 Pages.

"Searching by Calendar or Timeline", Retrieved from <<https://www.safaribooksonline.com/library/view/david-pogues-digital/9780596156800/ch09s11.html>>, Retrieved Date: Aug. 18, 2014, 1 Page.

"Time Flow Analytical Timeline Visual Timelines for Investigation", Retrieved from <<https://web.archive.org/web/20101002044144/http://github.com/FlowingMedia/TimeFlow/wiki>>, Oct. 28, 2010, 2 Pages.

"Using ADF Timeline Components", Retrieved from<<https://web.archive.org/web/20131025010316/http://docs.oracle.com/cd/E28280_01/web.1111/b31973/dv_timeline.htm>>, Oct. 25, 2013, 17 Pages.

"WinForms Schedule Control Quick Start Guide", Retrieved from <<http://www.devcomponents.com/kb2/?p=404>>, Jul. 25, 2011, 32 Pages.

"Non-Final Office Action Issued in U.S. Appl. No. 14/518,425", dated Sep. 15, 2016, 30 Pages.

"Non-Final Office Action Issued in U.S. Appl. No. 14/518,664", dated Feb. 3, 2017, 20 Pages.

"Non-Final Office Action Issued in U.S. Appl. No. 14/518,824", dated Dec. 30, 2016, 24 Pages.

"Final Office Action Issued in U.S. Appl. No. 14/519,089", dated Sep. 13, 2016, 35 Pages.

"Non-Final Office Action Issued in U.S. Appl. No. 14/519,089", dated Jun. 16, 2016, 29 Pages.

"Non-Final Office Action Issued in U.S. Appl. No. 14/520,293", dated Mar. 9, 2017, 20 Pages.

Batrinca, et al., "A Timeline Visualization for Multi-Team Collaborative Planning", In Proceedings of the Extended Abstracts on Human Factors in Computing Systems, Apr. 27, 2013,pp. 157-162.

Gear, Adeline, "ZenDay, an Efficient Time Management App with a 3D Interface", Retrieved from<<http://theapptimes.com/zenday-an-efficient-time-management-app-with-a-3d-interface/>>, May 24, 2013, 5 Pages.

Jong, et al., "Timeline Documentation", Retrieved from<<http://almende.github.io/chap-links-library/js/timeline/doc/>>, Jul. 16, 2014, 15 Pages.

Ocull, Heather", Timelines Everywhere: See and share your work with ease in SharePoint and PWA", Retrieved from<<https://web.archive.org/web/20140215211531/http://blogs.office.com/2012/09/07/timelines-everywhere-see-and-share-your-work-with-ease-in-sharepoint-and-pwa/>>, Sep. 7, 2012,11 Pages.

"International Search Report & Written Opinion Issued in PCT Application No. PCT/US2015/036561", dated Oct. 26, 2015, 9 Pages.

"International Preliminary Report on Patentability Issued in PCT Application No. PCT/US2015/036563", dated Oct. 6, 2016, 7 Pages.

(56) References Cited

OTHER PUBLICATIONS

"International Search Report & Written Opinion Issued in PCT Patent Application No. PCT/US2015/036563", dated Sep. 11, 2015, 9 Pages.
"Second Written Opinion Issued in PCT Patent Application No. PCT/US2015/036563", dated Jun. 1, 2016, 6 Pages.
"International Search Report & Written Opinion Issued in PCT Application No. PCT/US2015/036565", dated Sep. 21, 2015, 9 Pages.
"International Preliminary Report on Patentability Issued in PCT Application No. PCT/US2015/036568", dated Sep. 22, 2016, 7 Pages.
"International Search Report & Written Opinion Issued in PCT Application No. PCT/US2015/036568", dated Dec. 11, 2015, 10 Pages.
"Second Written Opinion Issued in PCT Application No. PCT/US2015/036568", dated May 17, 2016, 6 Pages.
"International Preliminary Report on Patentability Issued in PCT Application No. PCT/US2015/036569", dated Oct. 6, 2016, 6 Pages.
"International Search Report and Written Opinion Issued in PCT Application No. PCT/US2015/036569", dated Oct. 8, 2015, 9 Pages.
"Second Written Opinion Issued in PCT Application No. PCT/US2015/036569", dated Jun. 1, 2016, 5 Pages.
"International Preliminary Report on Patentability Issued in PCT Application No. PCT/US2015/036570", dated Jul. 4, 2016, 6 Pages.
"International Search Report & Written Opinion Issued in PCT Patent Application No. PCT/US2015/036570", dated Sep. 11, 2015, 9 Pages.
"Second Written Opinion Issued in PCT Patent Application No. PCT/US2015/036570", dated Apr. 11, 2016, 5 Pages.
"International Preliminary Report on Patentability Issued in PCT Application No. PCT/US2015/036571", dated Sep. 22, 2016, 7 Pages.
"International Search Report & Written Opinion Received for PCT Patent Application No. PCT/US2015/036571", dated Sep. 11, 2015, 9 Pages.
"Second Written Opinion Issued in PCT Application No. PCT/US2015/036571", dated May 17, 2016, 6 Pages.
Valerie, "Wrike Adds Recurring Tasks Feature to All Accounts For Free", Retrieved from <<https://web.archive.org/web/20100106182058/http://www.wrike.com/blog/12/16/2009/Wrike-Adds-Recurring-Tasks-Feature-to-All-Accounts-For-Free>>, Dec. 16, 2009, 3 Pages.
Vascellari, Andrea, "How to Use Google Calendar as a Project Management Tool", Retrieved from <<http://lifehacker.com/5918676/how-to-use-google-calendar-as-aproject-management-tool>>, Jun. 15, 2012, 7 Pages.
"Performance Timeline", Retrieved from <<https://www.w3.org/TR/2013/PR-performance-timeline-20131031/>>, Oct. 31, 2013, 6 Pages.
"Non-Final Office Action Issued in U.S. Appl. No. 14/518,515", dated Apr. 12, 2017, 32 Pages.
Price, David, "iOS 7 Safari tips: How to access iOS 7's new web features", Retrieved from: http://www.macworld.co.uk/news/apple/ios-7-safari-tips-how-access-ios-7s-new-web-features-3470866/, Oct. 2013, pp. 1-7.

"Final Office Action Issued in U.S. Appl. No. 14/494,404", dated Jul. 27, 2017, 40 Pages.
"Non Final Office Action Issued in U.S. Appl. No. 14/494,404", dated Apr. 20, 2017, 33 Pages.
"Final Office Action Issued in U.S. Appl. No. 14/518,425", dated Jun. 15, 2017, 31 Pages.
"Final Office Action Issued in U.S. Appl. No. 14/518,425", dated Feb. 16, 2018, 37 Pages.
"Non Final Office Action Issued in U.S. Appl. No. 14/518,425", dated Jul. 3, 2018, 44 Pages.
"Non Final Office Action Issued in U.S. Appl. No. 14/518,425", dated Sep. 7, 2017, 32 Pages.
"Final Office Action Issued in U.S. Appl. No. 14/518,515", dated Sep. 7, 2017, 41 Pages.
"Final Office Action Issued in U.S. Appl. No. 14/518,664", dated Jul. 12, 2017, 22 Pages.
"Non Final Office Action Issued in U.S. Appl. No. 14/518,664", dated Oct. 10, 2017, 7 Pages.
"Final Office Action Issued in U.S. Appl. No. 14/518,824", dated Jun. 30, 2017, 19 Pages.
"Final Office Action Issued in U.S. Appl. No. 14/520,293", dated Sep. 18, 2017, 24 Pages.
Mann, et al., "W3C; Performance Timeline W3C Proposed Recommendation", Retrieved from: https://www.w3.org/TR/2013/PR-performance-timeline-20131031/, Oct. 31, 2013, pp. 1-6.
"First Office Action and Search Report Issued in Chinese Patent Application No. 201580033143.5", dated Dec. 29, 2018, 15 Pages.
"Final Office Action Issued in U.S. Appl. No. 14/518,425", dated Nov. 28, 2018, 37 Pages.
"Non Final Office Action Issued in U.S. Appl. No. 14/518,425", dated Mar. 21, 2019, 34 Pages.
"Office Action Issued in European Patent Application No. 15733972.2", dated Feb. 22, 2019, 7 Pages.
"Second Office Action and Search Report Issued in Chinese Patent Application No. 201580033143.5", dated Aug. 1, 2019, 16 Pages.
"Non Final Office Action Issued in U.S. Appl. No. 14/518,664", dated Jun. 21, 2019, 18 Pages.
"Third Office Action Issued in Chinese Patent Application No. 201580033143.5", dated Mar. 30, 2020, 26 Pages.
"Context Menu—Wikipedia, the free Encyclopedia", Retrieved From https://en.wikipedia.org/w/index.php?%20title=Context_menu&oldid=66576229, Jul. 26, 2006, 1 Page.
"Office Action Issued In European Patent Application No. 15736089.2", dated Oct. 7, 2019, 10 Pages.
"Notice of Allowance Issued In U.S. Appl. No. 14/518,664", dated Feb. 3, 2020, 10 Pages.
"Final Office Action Issued In U.S. Appl. No. 14/518,664", dated Oct. 31, 2019, 21 Pages.
"Office Action and Search Report Issued in Chinese Patent Application No. 201580033143.5", dated Dec. 3, 2019, 11 Pages.
Brown, et al., "Lotus Notes—Domino 5", Jan. 1, 2001, pp. 75-79.
"Summons to Attend Oral Proceedings Issued in European Patent Application No. 15736089.2", Mailed Date: Apr. 26, 2021, 13 Pages.
Boyce, Jim, "Managing a Calendar in Microsoft Outlook 2013", Retrieved From: https://www.microsoftpressstore.com/articles/printerfriendly/2224059, Mar. 15, 2013, 24 Pages.

* cited by examiner

SEARCH AND LOCATE EVENT ON CALENDAR WITH TIMELINE

RELATED APPLICATIONS

This applications claims the benefit of U.S. Provisional Patent Application Ser. No. 62/015,350 filed on Jun. 20, 2014. The disclosure of the provisional application is incorporated herein in its entirety.

BACKGROUND

Legacy calendar views in scheduling applications provide limited information. Alternatively, the legacy calendar views in scheduling applications provide excessive information. Legacy calendar views are usually used in detailed configurations for daily and weekly actions. However, users are underserved in long term synapsis of associated actions in legacy calendar views. Addition of actions and other items into legacy calendar views prove challenging for long term synapsis of associated actions.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to searching and locating an event on a calendar with a timeline. In some example embodiments, a calendar application may detect a search on the calendar. One or more events may be located on the calendar that match a search term of the search. The search term may be highlighted on the one or more events. The one or more events may be displayed with the search term that is highlighted on the calendar.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, an event may be searched and located on a calendar with a timeline by a calendar application. The calendar application may detect a search on the calendar. One or more events may be located on the calendar that match a search term of the search. The search term may be highlighted on the one or more events. The one or more events may be displayed with the search term that is highlighted on the calendar.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable memory device includes a hardware device that includes a hard disk drive, a solid state drive, a compact disk, a memory chip, among others. The computer-readable storage medium can for example be implemented via one or more of a volatile computer memory, a non-volatile memory, a hard drive, and a flash drive.

Throughout this specification, the term "platform" may be a combination of software and hardware components to search and locate an event on a calendar with a timeline. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

Figure 1:
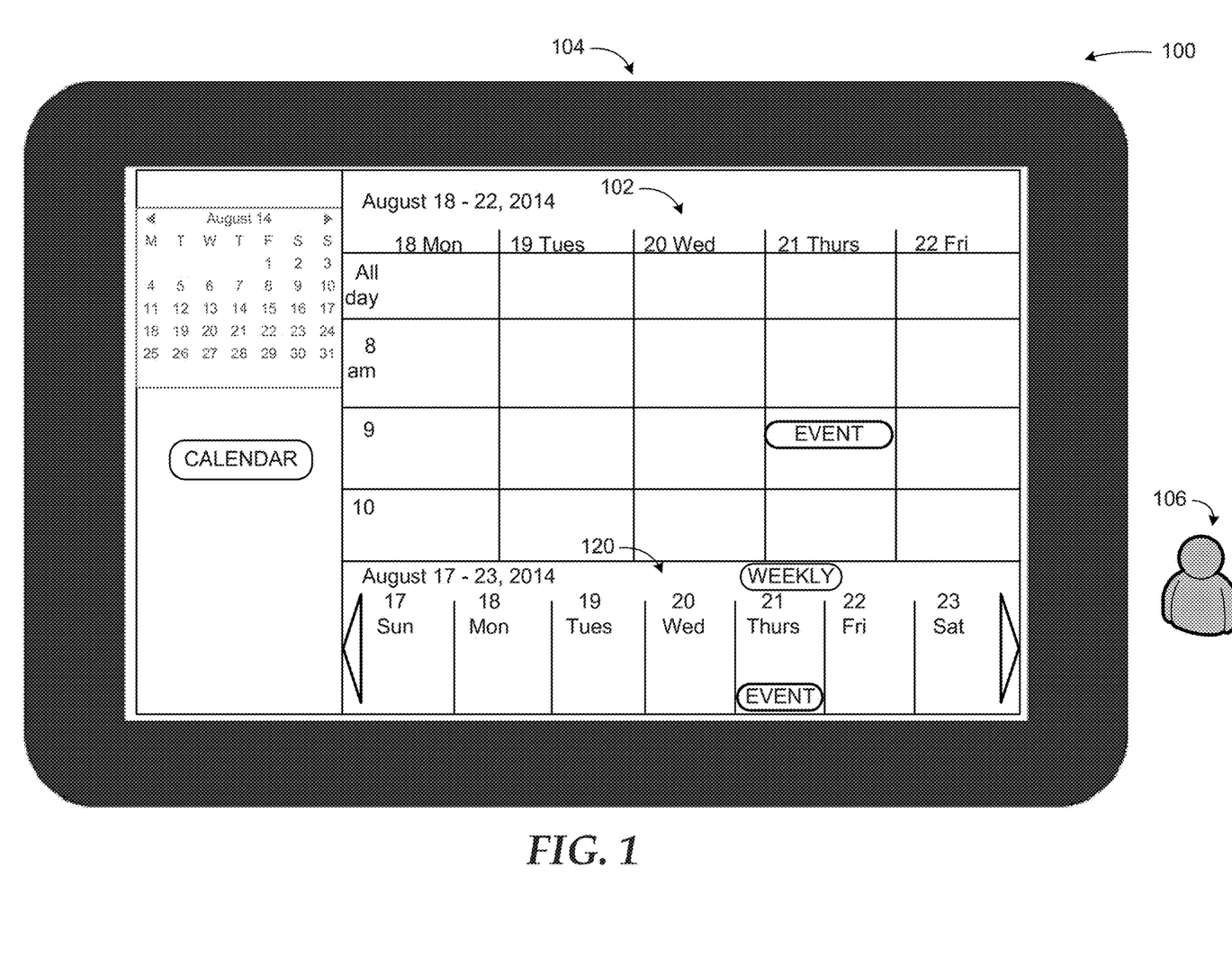
FIG. 1 is a conceptual diagram illustrating an example of searching and locating an event on a calendar with a timeline, according to embodiments.

FIG. 1 is a conceptual diagram illustrating an example of searching and locating an event on a calendar with a timeline, according to embodiments.

In a diagram 100, a computing device 104 may execute a calendar application 102. The computing device may include a tablet device, a laptop computer, a desktop computer, a smart phone, among others. The computing device 104 may display the calendar application 102 to a user 106. The user 106 may be allowed to interact with the calendar application 102 through an input device or touch enabled display component of the computing device 104. The user 106 may interact with the calendar application 102 with a keyboard based input, a mouse based input, a voice based input, a pen based input, a gesture based input, among others. The gesture based input may include one or more touch based actions such as a touch action, a swipe action, a combination of each, among others.

The calendar application 102 may include a timeline 120 as a component placed adjacent to and below a calendar. The timeline 120 may also be presented as a stand-alone component. The timeline 120 may include a linear presentation of events during a time period divided based on a time unit such as a day. Events presented on the timeline may be duplicates of the events on the calendar displayed by the calendar application 102. A user 106 may be allowed to interact with the calendar and the timeline 120 to search and locate an event. The event may be displayed on the calendar and duplicated on the timeline 120.

While the example system in FIG. 1 has been described with specific components including the computing device 104, the calendar application 102, the timeline 120, embodiments are not limited to these components or system configurations and can be implemented with other system configuration employing fewer or additional components.

Figure 2:
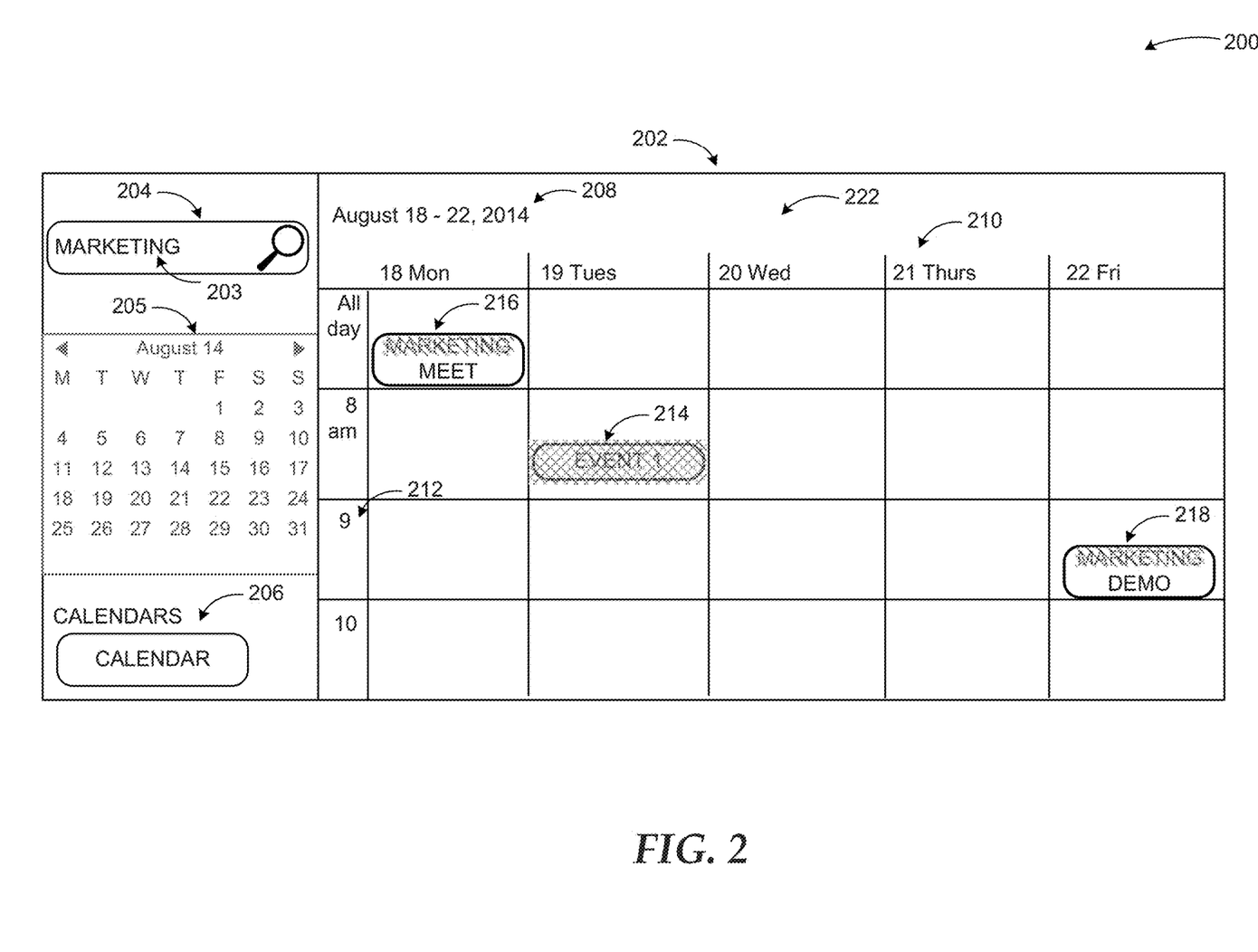
FIG. 2 illustrates an example of a search on a calendar, according to embodiments.

FIG. 2 illustrates an example of a search on a calendar, according to embodiments.

In a diagram 200, a calendar application 202 that displays a calendar 222 used to search and locate an event may be described. The calendar application 202 may display a search tool 204 to allow a user to conduct a search on the calendar 222. The search tool may provide text box to receive a search term 203. The search tool 204 may also provide a search control to initiate the search. The search term 203 may include a title, a subject, a summary, a description, a label, among other attributes associated with one or more events displayed on the calendar 222. The search term 203 may include one or more categories, one or more attendees, one or more groups, a content of one or more documents associated with one or more events displayed on the calendar 222.

In response to an activation of the search control, the calendar application 202 may match the search term 203 (input by an external entity) in the search tool 204 to an attribute of one or more events in the calendar 222. Events (216, 218) may have subjects that include the search term 203. The calendar application 202 may match the search term to the events (216, 218). The search term 203 may be highlighted on the events (216, 218). The events (216, 218) that match the search term 203 may be displayed with the search term 203 highlighted on the events (216, 218) Other events such as an event 214 that do not match the search term 203 may be hidden. The calendar application 202 may render the event 214 as transparent compared to the events (216, 218) to emphasize the event 214 failing to match the search term 203.

The search term 203 may be shared with an authorized external entity. The authorized external entity may include a user, a social network, a service, an application, among others. The events (216, 218) that match the search term 203 may also be shared with the external entity. An example scenario may include insertion of the events (216, 218) into a web page associated with an authorized web application to provide the events (216, 218) to authorized external entities that access the web page.

The calendar application 202 may also display additional controls associated with the calendar 222. A date picker component 205 may allow a user to select a date from a displayed range. The selected date may be displayed in the calendar 222 that shows the date within a date range that is configurable. The date range of the calendar 222 may include a day, a week, a month, a year, among others. A current date range may be illustrated with a date range label 208. The date range may also be partitioned vertically based on a time unit such as a day 210. The time units may be scrollable. The calendar 222 may also be partitioned horizontally based on an hour based unit 212. The hour based units may be scrollable. An "all day" unit may persist on a top section of the calendar 222 to show one or more events that last during a time unit such as a day.

The calendar 222 may also be selectable through a calendar selection control 206. The calendar application 202 may display one or more calendars that may be selectable through the calendar selection control 206 and other calendar selection controls displayed adjacent to the calendar selection control 206.

Figure 3:
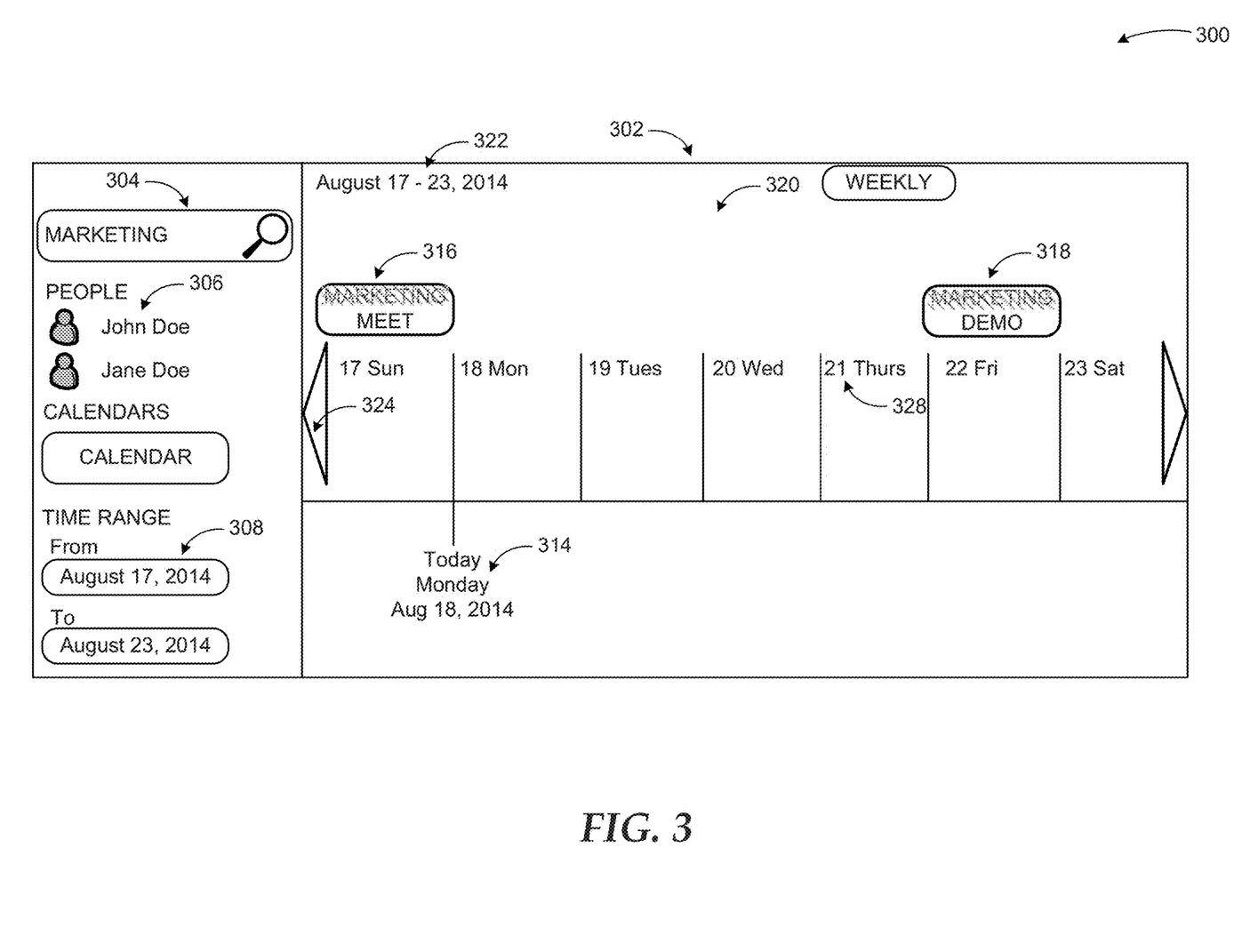
FIG. 3 illustrates an example of a search on a timeline, according to embodiments.

FIG. 3 illustrates an example of a search on a timeline, according to embodiments.

In a diagram 300, a calendar application 302 may display a timeline 320 to provide events in a linear presentations. The timeline 320 may be displayed stand-alone or in conjunction with a calendar. The events displayed in the timeline 320 may be duplicates of events stored in the calendar. In addition, the timeline 320 may display a date range of events that may be scrollable through a scroll control 324. The date range may be presented with a date range label 322. The date range may be partitioned based on time units such as an hour, a day 328, a week, a month, a year, among others. The date range may be selectable based on a selection of the range by a user through a range selection control such as "weekly," among others.

The calendar application 302 may provide a search control 304 that provides a text box to input a search term and a search control to initiate the search. In response to an activation of the search control, the search term may be matched to attributes of the events displayed on the timeline 320. The events (316, 318) that match the search term may be displayed with the search term highlighted on the events (316, 318). Events that fail to match to search term may be hidden through a transparent rendering or another scheme. A current date label 314 may also be displayed on the timeline 320 in response to a detection that a date range of the events (316, 318), that match the search term, may include a current date. The search term and the events (316, 318) may be shared with an authorized external entity that includes a user, a social network, a service, an application, among others.

The calendar application 302 may also display one or more people selection controls 306 that select a subset of events displayed on the timeline associated with one or more users. Each one of the one or more people selection controls may correspond to a user associated with the calendar application 302. The calendar application 302 may detect an activation of one of the people selection controls 306. A subset of the events (316, 318) may be displayed on the timeline 320, where the subset is associated with the user represented by the selected people selection control. A remaining or non-selected subset of the events may be hidden through a transparency rendering, or another scheme. Alternatively, an activation of one of the people selection controls 306 may cause the calendar application 302 to share the events (316, 318) that match the search term and the search term with the user associated with the activated people selection control.

The calendar application 302 may also display a time range control 308. The time range control 308 may allow for input of a start date and end date of a date range to display on the timeline 320. In response to detecting input of an expansionary time range on the time range control 308, the search may be expanded to include additional events based on the time range encompassing the events (316, 318) and additional events outside the dates of the events (316, 318). In response to detecting input of a contractionary time range on the time range control 308, the search may be narrowed to include a subset of the events (316, 318) based on which of the events (316, 318) are encompassed by the contractionary time range.

Figure 4:
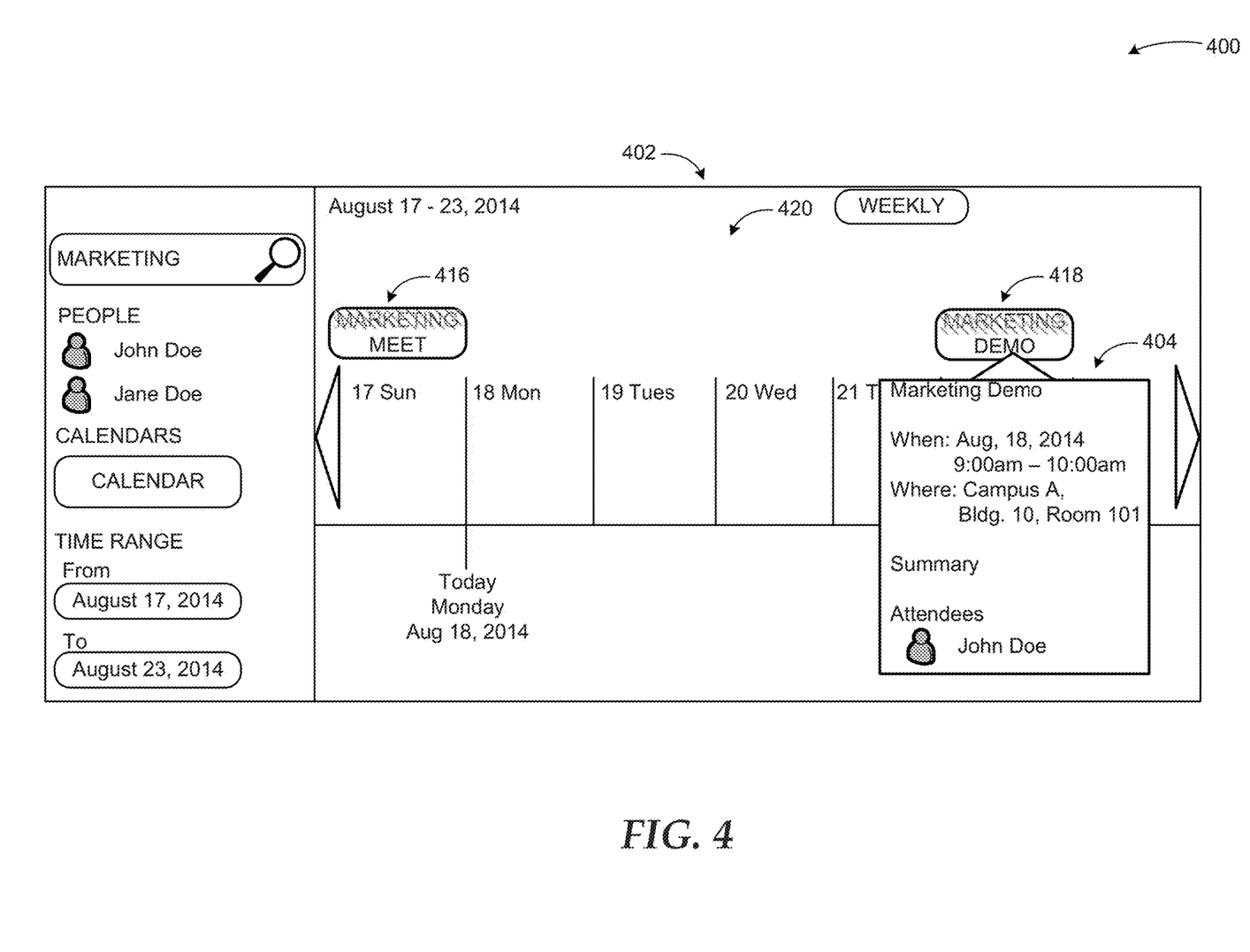
FIG. 4 illustrates an example of an event peek on a search result displayed on a timeline, according to embodiments.

FIG. 4 illustrates an example of an event peek on a search result displayed on a timeline, according to embodiments.

In a diagram 400, an event peek 404 may be displayed in response to a selection of an event 418 by the calendar application 402. The events (416, 418) may be displayed with a search term highlighted to illustrate the matched events. The calendar application 402 may detect a selection action on an event 418 that matches the search term. The event peek display 404 may be displayed in response to the selection action. A title of the event 418, a location of the event 418, a time of the event 418, a description of the event 418, a creator of the event 418, among other attributes of the event 418 may be displayed on the event peek 404. A map of the location of the event 418 may also be displayed in the event peek 404.

The event peek 404 may be displayed based on a duration of the selection action. An example may include displaying the event peek 404 during a hover action by a mouse input, a touch based input, among other input types. Alternatively, the event peek 404 may be displayed in a persistent state that may be dismissed by an additional input.

The technical advantage of searching and locating an event on a calendar with a timeline may be improved usability and enhanced reliability of display devices in providing event search, and location, among other features compared to static event presentation based solutions.

The example scenarios and schemas in FIG. 1 through 4 are shown with specific components, data types, and configurations. Embodiments are not limited to systems according to these example configurations. Searching and locating an event on a calendar with a timeline may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
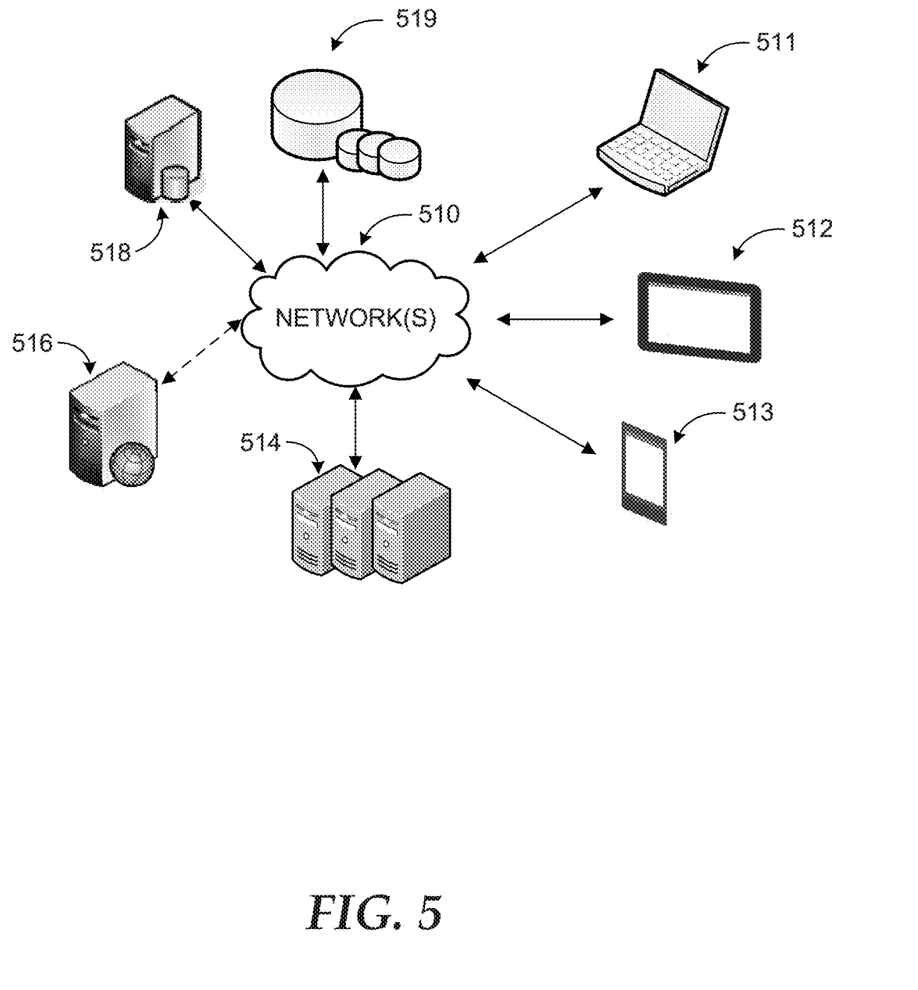
FIG. 5 is a simplified networked environment, where a system according to embodiments may be implemented.

FIG. 5 is an example networked environment, where embodiments may be implemented. A calendar application configured to search and locate an event on a calendar with a timeline may be implemented via software executed over one or more servers 514 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516. A calendar application may search and locate one or more events of a calendar or a timeline that match a search term of a search. One or more events with the search term may be displayed with the search term highlighted on the one or more events. The calendar application may store data associated with the calendar and the timeline in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to search and locate an event on a calendar with a timeline. Furthermore, the networked environments discussed in FIG. 5 are for illustration purposes only. Embodiments are not limited to the example applications, modules, or processes.

Figure 6:
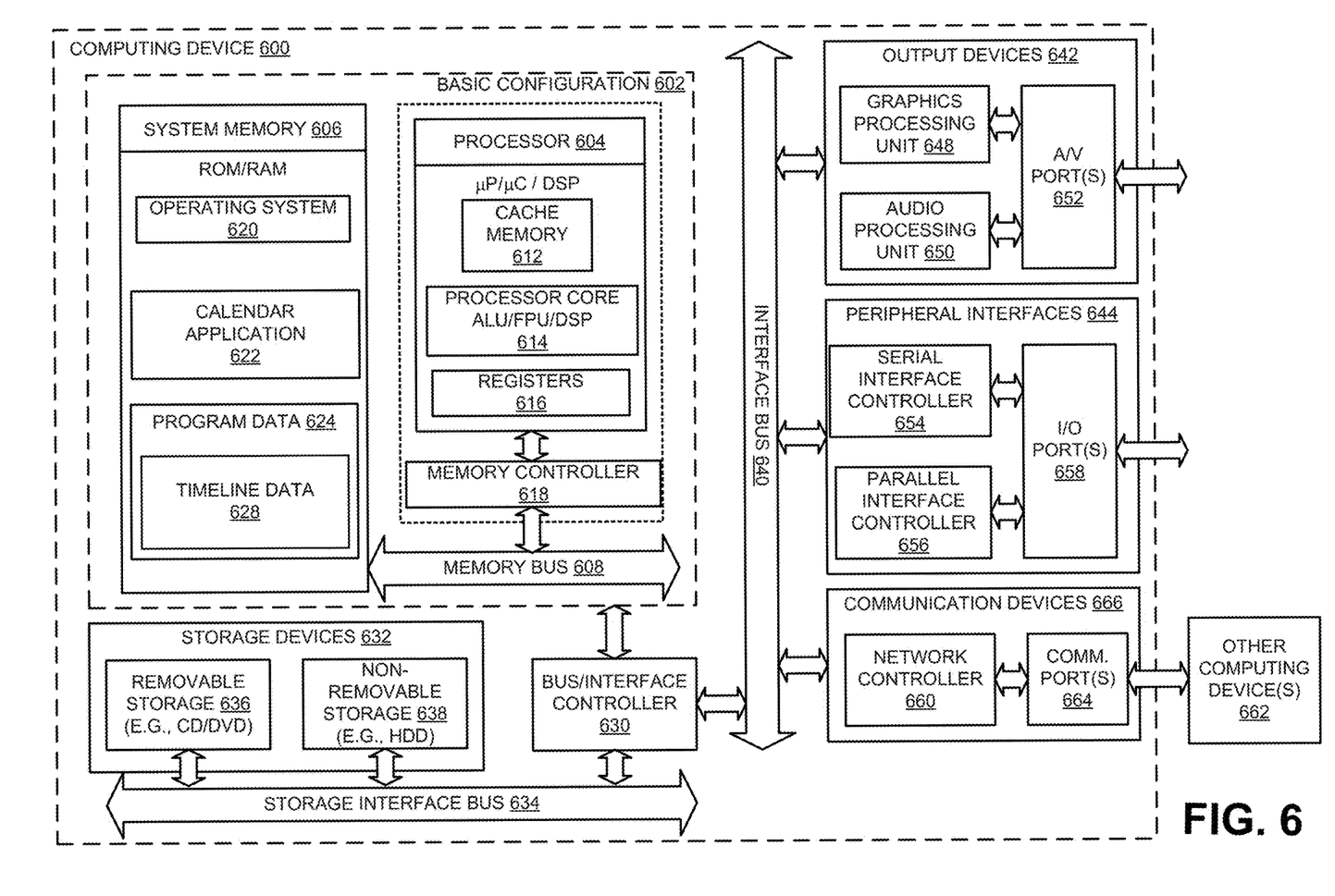
FIG. 6 illustrates a general purpose computing device, which may be configured to search and locate an event on a calendar with a timeline.

FIG. 6 illustrates a general purpose computing device, which may be configured to search and locate an event on a calendar with a timeline, arranged in accordance with at least some embodiments described herein.

For example, the computing device 600 may be used to search and locate an event on a calendar with a timeline. In an example of a basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including, but not limited to, a microprocessor (µP), a microcontroller (µC), a digital signal processor (DSP), or any combination thereof. The processor 604 may include one more levels of caching, such as a level cache memory 612, a processor core 614, and registers 616. The processor core 614 may include an arithmetic logic unit (ALU), a floating point unit (FPU), a digital signal processing core (DSP Core), or any combination thereof. A memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a calendar application 622, and a program data 624. The calendar application 622 may search and locate one or more events of a calendar or a timeline that match a search term of a search. One or more events with the search term may be displayed with the search term highlighted on the one or more events. Components of the calendar application 622

(such as a user interface) may also be displayed on a display device associated with the computing device 600. An example of the display device may include a hardware screen that may be communicatively coupled to the computing device 600. The display device may include a touch based device that detects gestures such as a touch action. The display device may also provide feedback in response to detected gestures (or any other form of input) by transforming one or more user interfaces of the calendar application 622 such as the calendar and the timeline, displayed by the touch based device. The program data 624 may include, among other data, a timeline data 628, or the like, as described herein. The timeline data 628 may include the event, subject name of the event, the event date, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636, and the non-removable storage devices 638 may be examples of computer storage media. Computer storage media may include, but may not be limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 may include a graphics processing unit 648 and an audio processing unit 650, which may be configured to communicate to various external devices, such as a display or speakers via one or more A/V ports 652. One or more example peripheral interfaces 644 may include a serial interface controller 654 or a parallel interface controller 656, which may be configured to communicate with external devices, such as input devices (for example, keyboard, mouse, pen, voice input device, touch input device, etc.) or other peripheral devices (for example, printer, scanner, etc.) via one or more I/O ports 658. An example communication device 666 may include a network controller 660, which may be arranged to facilitate communications with one or more other computing devices 662 over a network communication link via one or more communication ports 664. The one or more other computing devices 662 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include searching and locating an event on a calendar with a timeline. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

Figure 7:
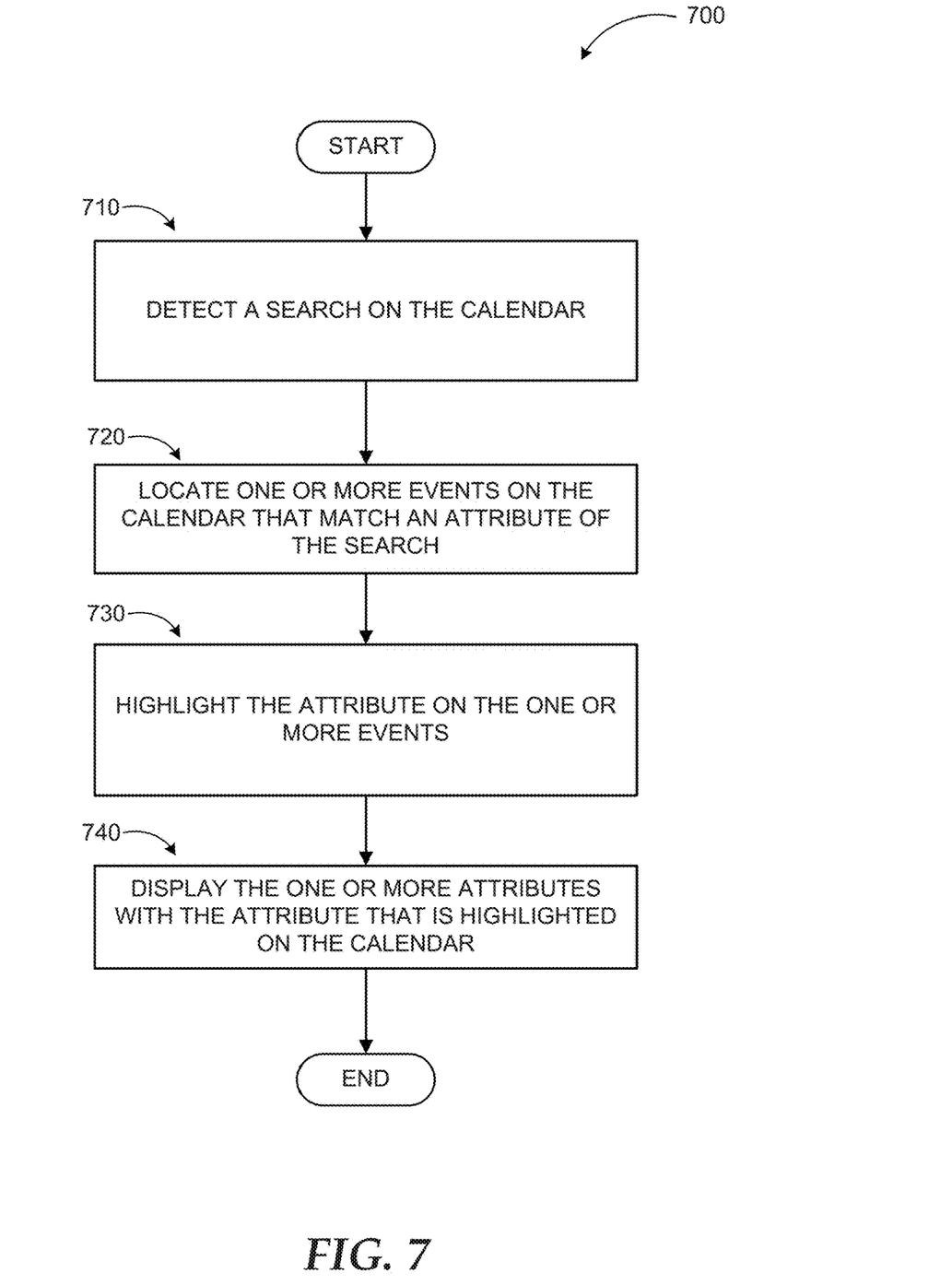
FIG. 7 illustrates a logic flow diagram for a process to search and locate an event on a calendar with a timeline, according to embodiments.

FIG. 7 illustrates a logic flow diagram for a process to search and locate an event on a calendar with a timeline, according to embodiments. Process 700 may be implemented on a calendar application.

Process 700 begins with operation 710, where a search on the calendar may be detected. At operation 720, one or more events on the calendar may be located that match a search term of the search. The search term on the one or more events may be highlighted at operation 730. At operation 740, the one or more events with the search term that is highlighted may be displayed on the calendar.

The operations included in process 700 are for illustration purposes. A calendar application according to embodiments may be implemented by similar processes with fewer or additional steps, as well as in different order of operations using the principles described herein.

According to some examples, a method that is executed on a computing device to search and locate an event on a calendar with a timeline may be described. The method may include detecting a search on the calendar, locating one or more events on the calendar that match a search term of the search, highlighting the search term on the one or more events, and displaying the one or more events with the search term that is highlighted on the calendar.

According to other examples, the method may further include detecting the search term to include one or more from a set of: one or more categories, one or more attendees, one or more groups, a content of one or more documents associated with the one or more events. The search term may be matched to one or more from a set of: a title, a subject, a summary, a description, and a label of the one or more events. Other events that do not match the search term may be detected and the other events may be hidden. A time range control may be provided to expand the search to include additional events based on the time range encompassing the one or more events and the additional events. A time range control may be provided to narrow the search to include a subset of the one or more events based on the time range encompassing the subset. The search term may be shared with an authorized external entity that includes one or more from a set of: a user, a social network, a service, and an application and the one or more events may be shared with the authorized external entity.

According to further examples, the method may further include locating one or more events on a timeline of the calendar that match the search term of the search, wherein the one or more events on the timeline are duplicates of the one or more events on the calendar. The search term may be highlighted on the one or more events on the timeline and the one or more events may be displayed on the timeline with the search term that is highlighted. A current date may be displayed label on the timeline, in response to detecting the one or more events on the timeline to be within a date range of the timeline that includes a current date. Other events may be detected on the timeline that do not match the search term of the search and the other events may be hidden on the timeline.

According to some examples, a computing device to search and discover an event on a calendar with a timeline may be described. The computing device may include a display device, a memory, a processor coupled to the memory and the display device. The processor may be configured to execute a calendar application in conjunction with instructions stored in the memory. The calendar application may be configured to detect a search on the calendar, locate one or more events on the calendar and one or more events on a timeline of the calendar that match a search term of the search, wherein the one or more events on the timeline are duplicates of the one or more events on the calendar, highlight the search term on the one or more events on the calendar and the one or more events on the timeline, and display the one or more events on the calendar and the one or more events on the timeline with the search term that is highlighted on the calendar, on the display device.

According to other examples, the calendar application is further configured to detect a selection action on one of the one or more events on the timeline, display an event peek, on the display device, and display one or more from a set of: a title of the event, a location of the event, a time of the event, a description of the event, and a creator of the event in the event peek, on the display device. One or more people selection controls that select a subset of the one or more events on the timeline associated with a user may be displayed, on the display device. The calendar application is further configured to detect an activation of one of the one or more people selection controls, display the subset of the one or more events on the timeline, wherein the subset is associated with the user represented by the people selection control, and hide a non-selected subset of the one or more events. The calendar application is further configured to detect an activation of one of the one or more people selection controls and share the subset of the one or more events on the timeline associated with the user represented by the people selection control.

According to some examples, a computer-readable memory device with instructions stored thereon to search and locate an event on a calendar with a timeline may be described. The instructions may include actions that are similar to the method described above.

According to some examples, a means to manage an event on a calendar with a timeline may be described. The means to manage an event on a calendar with a timeline may include a means for detecting a search on the calendar, a means for locating one or more events on the calendar that match a search term of the search, a means for highlighting the search term on the one or more events, and a means for displaying the one or more events with the search term that is highlighted on the calendar.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to search and locate an event on a calendar with a timeline, the method comprising:
    providing a user interface displaying a calendar view and a scrollable timeline, the calendar view displaying a plurality of events within a grid representation of a first plurality of dates and the scrollable timeline displaying at least one of the plurality of events within a linear representation of a second plurality of dates, wherein the first plurality of dates is different from the second plurality of dates;
    providing a search tool with a text input element;
    detecting an input of a search term into the text input element; and
    in response to detecting the input of the search term, locating an event included in the plurality of events matching the search term, wherein one or more of a title, a subject, a summary, a description, or a label of the event matches the search term, and
    transforming the user interface, wherein the transformation comprises highlighting the search term on the located event as displayed on both the calendar view and the scrollable timeline.

2. The method of claim 1, further comprising:
    detecting the search term to include one or more from a set of a category, an attendee, a group, a content of a document associated with the event.

3. The method of claim 1, further comprising, in response to detecting the input of the search term:
    detecting a second event included in the plurality of events that does not match the search term; and
    transforming the user interface to hide the second event within both the calendar view and the scrollable timeline.

4. The method of claim 1, further comprising:
    providing a time range control to set a time range for locating the event.

5. The method of claim 1, further comprising:
sharing the search term with an authorized external entity that includes one or more from a set of: a user, a social network, a service, and an application; and
sharing the event with the authorized external entity.

6. The method of claim 1, further comprising:
providing a current date label on the scrollable timeline.

7. A computing device to search and locate an event, the computing device comprising:
a memory;
a processor coupled to the memory, the processor, via executing a calendar application in conjunction with instructions stored in the memory, configured to:
provide a user interface displaying a calendar view and a scrollable timeline, the calendar view displaying a plurality of events within a grid representation of a first plurality of dates and the scrollable timeline displaying at least one of the plurality of events within a linear representation of a second plurality of dates, wherein the first plurality of dates is different from the second plurality of dates;
provide a search tool with a text input element;
detect an input of a search term into the text input element; and
in response to detecting the input of the search term, locate a first event included in the plurality of events matching the search term, wherein one or more of a title, a subject, a summary, a description, or a label of the first event matches the search term;
detect a second event included in the plurality of events falling within at least one of the first plurality of dates and the second plurality of dates that does not match the search term, and
transform the user interface, wherein the transformation comprises highlighting the search term on the located first event as displayed on both the calendar view and the scrollable timeline, and the detected second event is hidden from at least one of the calendar view and the scrollable timeline on the transformed user interface.

8. The computing device of claim 7, wherein the processor is further configured to:
detect a selection action on the first event on the scrollable timeline; and
provide an event peek in response to the selection action.

9. The computing device of claim 8, wherein the processor is further configured to:
provide one or more from a set of: the title of the first event, a location of the first event, a time of the first event, the description of the first event, and a creator of the first event in the event peek.

10. The computing device of claim 7, wherein the processor is further configured to:
provide a person selection control.

11. The computing device of claim 10, wherein the processor is further configured to:
detect an activation of the person selection control; and
in response to detecting the activation of the person selection control, provide the first event on the scrollable timeline when the first event is associated with the user represented by the person selection control.

12. The computing device of claim 10, wherein the processor is further configured to:
detect an activation of the person selection control; and
in response to detecting the activation of the person selection control, share the first event with a user represented by the person selection control.

13. A non-transitory computer-readable memory device with instructions stored thereon to search and locate an event, the instructions comprising:
providing a user interface displaying a calendar view and a scrollable timeline, the calendar view displaying a plurality of events within a grid representation of a first plurality of dates and the scrollable timeline displaying at least one of the plurality of events within a linear representation of a second plurality of dates, wherein the first plurality of dates is different from the second plurality of dates;
providing a search tool with a text input element;
detecting an input of a search term into the text input element;
locating an event included in the plurality of events matching the search term, wherein one or more of a title, a subject, a summary, a description, or a label of the event matches the search term;
transforming the user interface, wherein the transformation comprises highlighting the search term on the located event as displayed on both the calendar view and the scrollable timeline;
detecting an activation of a people selection control; and
in response to detecting the activation of the people selection control, sharing the located event with one or more users associated with the people selection control.

14. The non-transitory computer-readable memory device of claim 13, wherein the instructions further comprise:
detecting a selection action on the event on the scrollable timeline; and
in response to detecting the selection action, providing one or more from a set of: the title of the event, a location of the event, a time of the event, the description of the event, and a creator of the event in an event peek.

15. The non-transitory computer-readable memory device of claim 13, wherein the instructions further comprise:
providing a time range control to set a time range for locating the event matching the search term.

* * * * *